United States Patent Office 3,042,542
Patented July 3, 1962

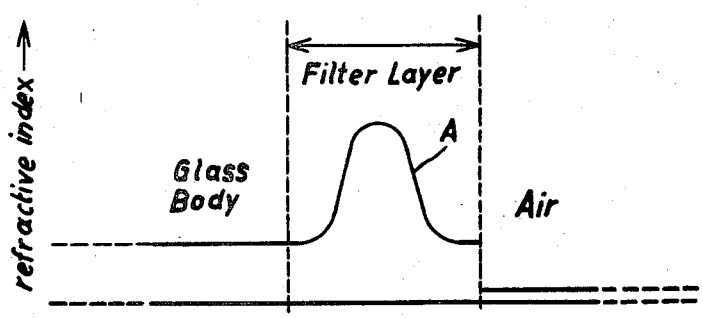

3,042,542
GLASS BODIES PROVIDED WITH COLORED LAYERS AND A METHOD FOR PRODUCING THE SAME
Hugo Anders, Wurttemberg, Germany, assignor to Carl Zeiss, Wurttemberg, Germany
Filed May 18, 1959, Ser. No. 813,992
Claims priority, application Germany May 21, 1958
3 Claims. (Cl. 117—33.3)

The invention relates to glass bodies provided with a colored layer and particularly is concerned with such glass bodies adapted to be employed as spectacle lenses for sunglasses.

In addition to solidly tinted glass bodies and other glass bodies or lenses which are provided with a colored or tinted glass sheet which is fused to a colorless glass body or lens, there are also known other glass bodies in which the light filtering action is produced entirely or almost entirely by thin metallic layers or dielectric layers which are applied to the surface of the glass body. These last mentioned layers, which are preferably employed in a thickness below the size of a wave length from within the central portion of the visible spectrum, are mostly employed in the form of two or more combined individual layers and the filtering action is based substantially upon the interference phenomena to which is often added a self-absorption of the metal of the layer. It is the interference phenomena which causes that such glasses produce a very pronounced colored reflection and that the minor changes in the thickness of these layers as they may be produced by finger prints and similar impurities result in very pronounced changes of the reflected color. The invention has the purpose to eliminate all of these very annoying effects.

The object of the present invention could theoretically be accomplished by employing a homogeneous coloring substance which itself has at least approximately the same index of refraction as the carrier of the layer, such as the glass body. Under homogeneous substances in this instant are understood, for instance, colored lacquers, the solvent of which in its solid condition has approximately the same index of refraction as glass. Such colored lacquer layers are, however, not suitable at all, because they do not have the required transparency nor do they possess a sufficient resistance against the influence of the elements and against mechanical injuries.

The aforementioned interference filters with their additional self-absorption consist of deeply colored metallic compounds, particularly metallic oxides. The same possess the desired transparency and resistance. However, the high effective index of refraction of these compounds distracts from the pleasant appearance of the spectacle lenses and also causes substantial colored reflections. On the other hand one employs in the known methods for the purpose of reducing the reflection in glasses of this type certain anorganic compounds, in particular fluorides, which possess refraction properties similar to the ones of the optical glasses. These anorganic compounds, however, are colorless and therefore are not suitable for the production of glasses having the desired substantial filtering properties or light protecting properties.

One of the objects of the present invention is the production of a glass body with a colored layer thereon. This layer may be applied to one or both sides of a glass body and consists of at least two ingredients having different indices of refraction, whereby at least one ingredient has a light absorbing property which is so distributed in the layer that at least on the boundary surface of the layer toward the glass on one hand, and on the other boundary surface directed toward the air on the other hand, is created an effective refractive power which is at least approximately the same as the refractive power of the glass.

The present invention will become more fully understood from the following description when considered in conjunction with the accompanying drawing which illustrates diagrammatically the characteristic of the refractive index of the light filtering device of the invention.

Referring to the drawing, a glass body is provided with a tinted surface layer which has a high absorption property. Such a layer is characterized by colored and colorless ingredients having different indices of refraction and which ingredients are distributed through the thickness of the layer so that the effective index of refraction of the layer on its boundary surface toward the glass on one hand and the other boundary surface toward the air on the other hand is at least approximately equal to the index of refraction of the glass, whereby between these two boundary surfaces a continuous varying index of refraction having a higher value in the center of the layer is in existence.

When selecting a higher concentration of the colored higher refractive ingredients between the two boundary surfaces, one obtains higher absorption values. The concentration follows a continuous distribution curve which first ascends and then declines again so that step-like changes in the effective refractive index within the layer are avoided.

For the purpose of producing a layer in accordance with the invention one starts in a most simple manner with two ingredients of which one may consist of a practically absorption free metal compound which has already an index of refraction which is approximately equal to the index of refraction of the glass body, while the second ingredient may be a higher refractive colored substance, preferably a metallic or oxidic substance which furnishes the desired absorption effect. One may proceed by starting with the precipitation of the colorless substance having the low index of refraction, whereupon firstly in an increasing and then in a decreasing manner the higher refractive colored substance is precipitated and then again alone the lower refractive substance. Each refractive layer starting with the glass has a variable index of refracting which ascends to a maximum value and finally ends with a lower value at the other side facing the air. Thereby it is possible, depending upon the desired degree of absorption, to change in the absorption characteristic the height or width of the maximum absorption.

For the production of the layers according to the invention there are employed suitable colorless metal compounds selected from the group consisting of cerium fluoride, thorium fluoride, magnesium fluoride and silicium dioxide. As colored ingredients are particularly suitable such metals which do not have an excessive affinity toward the anion of the other ingredients and are selected from the group consisting of nickel, iron, manganese and chromium and also the lower oxides of niobium, tantalum and titanium.

The glasses made in accordance with the present invention are at least as good as the known glasses which consist of a clear glass body and a colored layer thereon, particularly with respect to the hardness and the resistance of the colored layer. In addition, however, the colored glasses of the invention have the advantage that the reflections correspond only to those reflections produced by solidly tinted glasses and do not exceed the customary value. Furthermore, fingerprints and similar minor impurities are hardly visible in the glasses of the present invention.

I claim:
1. A light filtering device, comprising a transparent glass body having opposite surfaces, and a colored transparent layer of a material comprising a mixture of at least two inorganic substances of different refractive power arranged on at least one of said opposite surfaces, the substances having a higher refractive power being selected from the group consisting of iron, nickel, manganese, chromium, the lower oxides of niobium, the lower oxides of tantalum, and the lower oxides of titanium, and the substances having a lower refractive power being selected from the group consisting of cerium fluoride, thorium fluoride, magnesium fluoride, and silicium dioxide, with the employed substances being heterogeneously distributed in said layer in such a manner as to produce therein an index of refraction that is higher within the layer than at its surfaces where it is substantially equal to that of the glass body.

2. A light filtering device, comprising a transparent glass body having opposite surfaces, and a colored transparent layer of a material comprising a mixture of at least two inorganic substances of different refractive power arranged on one of said opposite surfaces, the substances having a higher refractive power being selected from the group consisting of iron, nickel, manganese, chromium, the lower oxides of niobium, the lower oxides of tantalum, and the lower oxides of titanium, and the substances having a lower refractive power being selected from the group consisting of cerium fluoride, thorium fluoride and silicium dioxide, with the employed substances being heterogeneously distributed in said layer in such a manner as to produce therein an index of refraction that is higher within the layer than at its surfaces where it is substantially equal to that of the glass body.

3. A light filtering device, comprising a transparent glass body having opposite surfaces, and a colored transparent layer of a material comprising a mixture of at least two inorganic substances of different refractive power arranged on both of said opposite surfaces, the substances having a higher refractive power being selected from the group consisting of iron, nickel, manganese, chromium, the lower oxides of niobium, the lower oxides of tantalum, and the lower oxides of titanium, and the substances having a lower refractive power being selected from the group consisting of cerium fluoride, thorium fluoride and silicium dioxide, with the employed substances being heterogeneously distributed in said layer in such a manner as to produce therein an index of refraction that is higher within the layer than at its surfaces where it is substantially equal to that of the glass body.

References Cited in the file of this patent
UNITED STATES PATENTS

| | | |
|---|---|---|
| 2,403,685 | Sachtleben | July 9, 1946 |
| 2,456,241 | Axler et al. | Dec. 14, 1948 |
| 2,600,579 | Ruedy et al. | June 17, 1952 |
| 2,636,420 | Ryan et al. | Apr. 28, 1953 |
| 2,660,925 | Turner | Dec. 1, 1953 |
| 2,741,157 | Goethert | Apr. 10, 1956 |
| 2,750,832 | Morgan | June 19, 1956 |
| 2,758,510 | Auwarter | Aug. 14, 1956 |
| 2,761,797 | Young | Sept. 4, 1956 |
| 2,808,351 | Colbert et al. | Oct. 1, 1957 |
| 2,854,349 | Dreyfus et al. | Sept. 30, 1958 |
| 2,861,896 | Kraus | Nov. 25, 1958 |